United States Patent
Shin et al.

(10) Patent No.: US 10,088,704 B2
(45) Date of Patent: Oct. 2, 2018

(54) DISPLAY DEVICE INCLUDING WIRE GRID POLARIZER AND MANUFACTURING METHOD THEREOF

(71) Applicant: Samsung Display Co., Ltd., Yongin-si (KR)

(72) Inventors: Hyun Eok Shin, Gwacheon-si (KR); Dong Min Lee, Anyang-si (KR); Chang Oh Jeong, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/438,647

(22) Filed: Feb. 21, 2017

(65) Prior Publication Data

US 2017/0269427 A1     Sep. 21, 2017

(30) Foreign Application Priority Data

Mar. 18, 2016 (KR) .................. 10-2016-0032677

(51) Int. Cl.
*G02F 1/1335* (2006.01)
*G02B 5/30* (2006.01)

(52) U.S. Cl.
CPC ..... *G02F 1/133528* (2013.01); *G02B 5/3058* (2013.01); *G02F 2001/133548* (2013.01)

(58) Field of Classification Search
CPC ... G02F 1/133528; G02F 2001/133548; G02B 5/3058
USPC ........... 359/485.05, 487.03; 349/96; 313/112
See application file for complete search history.

(56) References Cited

U.S. PATENT DOCUMENTS

| | | | |
|---|---|---|---|
| 7,573,546 B2 | 8/2009 | Lee et al. | |
| 8,861,080 B2 | 10/2014 | Lee et al. | |
| 9,158,052 B2 * | 10/2015 | Kim | ............. G02B 5/3058 |
| 9,400,346 B2 | 7/2016 | Kim et al. | |
| 2006/0119937 A1 | 6/2006 | Perkins et al. | |
| 2008/0145568 A1 * | 6/2008 | Lee | ............. C23C 18/1608 427/595 |
| 2012/0086887 A1 * | 4/2012 | Lee | ............. G02B 5/3058 349/62 |

(Continued)

FOREIGN PATENT DOCUMENTS

| | | |
|---|---|---|
| KR | 10-1234986 | 2/2013 |
| KR | 10-1340900 | 12/2013 |
| KR | 10-2015-0093891 | 8/2015 |

*Primary Examiner* — Frank Font
(74) *Attorney, Agent, or Firm* — H.C. Park & Associates, PLC

(57) ABSTRACT

A display device includes a substrate and a wire grid polarizer disposed on the substrate. The wire grid polarizer includes a first wire grid layer, a first middle layer, and a second wire grid layer. The first wire grid layer includes a plurality of first wire grid lines separated from each other. The first middle layer is disposed on the first wire grid layer. The first middle layer includes a first portion having a first middle layer thickness and a second portion having a second middle layer thickness thinner than the first middle layer thickness. The second middle layer thickness is thinner than a thickness of each first wire grid line. The second wire grid layer is disposed on the first middle layer and includes a plurality of second wire grid lines separated from each other. The second wire grid lines overlap the second portion of the first middle layer.

20 Claims, 7 Drawing Sheets

First direction
Second direction

(56) References Cited

U.S. PATENT DOCUMENTS

| | | | | |
|---|---|---|---|---|
| 2013/0120698 A1* | 5/2013 | Takakuwa | G02F 1/133512 | 349/110 |
| 2013/0342794 A1* | 12/2013 | Okada | G02B 5/3058 | 349/96 |
| 2015/0077851 A1* | 3/2015 | Wang | G02B 5/3058 | 359/485.05 |
| 2015/0116824 A1* | 4/2015 | Wang | G02B 1/08 | 359/485.05 |
| 2015/0160391 A1* | 6/2015 | Tsuruoka | G02B 5/3075 | 359/352 |
| 2016/0077263 A1* | 3/2016 | Kwak | C23F 4/00 | 349/96 |
| 2016/0124133 A1* | 5/2016 | Han | G02B 5/3058 | 349/43 |
| 2016/0139313 A1* | 5/2016 | Kim | G02B 5/3058 | 359/485.05 |
| 2016/0200033 A1* | 7/2016 | Lee | B29C 59/002 | 216/24 |
| 2017/0075051 A1* | 3/2017 | Jeong | G02B 5/3058 | |
| 2017/0184768 A1* | 6/2017 | Probst | G02B 5/3058 | |
| 2017/0242298 A1* | 8/2017 | Cunningham | G02F 1/133536 | |

* cited by examiner

DISPLAY DEVICE INCLUDING WIRE GRID POLARIZER AND MANUFACTURING METHOD THEREOF

CROSS-REFERENCE TO RELATED APPLICATION

This application claims priority from and the benefit of Korean Patent Application No. 10-2016-0032677, filed on Mar. 18, 2016, which is hereby incorporated by reference for all purposes as if fully set forth herein.

BACKGROUND

Field

The invention relates generally to a display device, and, more particularly, to a display device including a wire grid polarizer and a manufacturing method thereof.

Discussion of the Background

Liquid crystal displays (LCDs) are one of the most widely used flat panel displays, and an LCD includes a pair of panels provided with field-generating electrodes, such as pixel electrodes and a common electrode, and a liquid crystal (LC) layer interposed between the two panels. The LCD displays images by applying voltages to the field-generating electrodes to generate an electric field in the LC layer that determines the orientations of LC molecules therein to adjust polarization of incident light.

In general, polarizing plates are attached onto external surfaces of two sheets of display panels on which the field generating electrodes are formed, to control polarization of incident light. In this case, the polarizing plate is an absorption type of polarizing plate which absorbs light other than the desired polarized light. Therefore, only a small part of light from a light source supplying light to the liquid crystal display by the polarizing plate is used for displaying an image. As a result, light efficiency of the light source of the liquid crystal display is lowered.

In order to improve the light efficiency of the light source of the liquid crystal display, a wire grid polarizer has been proposed. Particularly, a nano-imprint method in which a manufacturing cost is low and accuracy is high when forming the wire grid polarizer has been suggested.

As the liquid crystal display becomes larger, the wire grid polarizer increases in size. When forming a large area wire grid polarizer, a nano-imprint mold also needs to have a large area. It is difficult to manufacture a large area nano-imprint mold and thus the manufacturing cost to make a large area wire grid polarizer is high.

Also, the wire grid polarizer may include a multi-layered wire grid layer. When it does, the wire grid polarizer includes a planarization layer disposed between the wire grid layers. But, the polarization efficiency may deteriorate or decrease due to the thickness of the planarization layer.

The above information disclosed in this Background section is only for enhancement of understanding of the background of the inventive concepts, and, therefore, it may contain information that does not form the prior art that is already known in this country to a person of ordinary skill in the art.

SUMMARY

Display devices constructed according to the principles of the invention, and methods of making such display devices, include a wire grid polarizer that reduces or prevents the deterioration of the polarization efficiency. For example, implementations of the invention may change the contours of a flat, planar middle layer extending across and between wire grid layers such that the middle layer is no longer a planarization layer, thereby reducing the thickness of the middle layer and the attendant deterioration of polarization efficiency.

Additional aspects will be set forth in the detailed description which follows, and, in part, will be apparent from the disclosure, or may be learned by practice of the inventive concepts.

According to a first aspect of the invention, a display device includes a substrate and a wire grid polarizer disposed on the substrate. The wire grid polarizer includes a first wire grid layer, a first middle layer, and a second wire grid layer. The first wire grid layer includes a plurality of first wire grid lines separated from each other. The first middle layer is disposed on the first wire grid layer. The first middle layer includes a first portion having a first middle layer thickness and a second portion having a second middle layer thickness thinner than the first middle layer thickness. The second middle layer thickness is thinner than a thickness of each first wire grid line. The second wire grid layer is disposed on the first middle layer and includes a plurality of second wire grid lines separated from each other. The plurality of second wire grid lines overlap the second portion of the first middle layer.

The second middle layer thickness may be about 20 nm or less.

The first middle layer may include an inorganic material and an organic material.

The first portion may be disposed at opposing sides of at least some of the first wire grid lines, and the first middle layer thickness may decrease with increasing distance from the opposing sides of the at least some of the first wire grid lines.

Each second wire grid line may be disposed between two adjacent ones of the first wire grid lines, and may overlap the second portion.

The plurality of first wire grid lines and the plurality of second wire grid lines may be alternately arranged with one another.

A pitch between one of the first wire grid lines and an adjacent one of the second wire grid lines may be about 150 nm or less.

The wire grid polarizer may further include a second middle layer disposed on the second wire grid layer, and a third wire grid layer disposed on the second middle layer. The third wire grid layer may include a plurality of third wire grid lines separated from each other.

The second middle layer may be made of the same material as the first middle layer, the second middle layer may include a third portion and a fourth portion having a thinner thickness than the third portion, a thickness of the fourth portion may be thinner than a thickness of each second wire grid line, the thickness of the fourth portion may be about 20 nm or less, and the plurality of third wire grid lines may overlap the fourth portion of the third middle layer.

The third portion may be disposed at opposing sides of at least some of the second wire grid lines, and a thickness of the third portion may decrease with increasing distance from the opposing sides of the at least some of the second wire grid lines.

Each third wire grid line may be disposed between two adjacent ones of the second wire grid lines, and may overlap the fourth portion.

Ones of the plurality of first wire grid lines, ones of the plurality of second wire grid lines, and ones of the plurality of third wire grid lines may be respectively sequentially arranged.

A pitch between one of the first wire grid lines and an adjacent one of the second wire grid lines may be about 100 nm or less, and a pitch between one of the second wire grid lines and an adjacent one of the third wire grid lines may be about 100 nm or less.

According to a second aspect of the invention, a method for manufacturing a display device includes: forming a first wire grid layer including a plurality of first wire grid lines separated from each other on a substrate; forming a first middle layer on the first wire grid layer with a first portion and a second portion being thinner than the first portion and thinner than a thickness of each first wire grid line; and forming a second wire grid layer including a plurality of second wire grid lines separated from each other on the first middle layer.

Forming the first middle layer may include coating a composition including an organic material, an inorganic material, and a solvent on the first wire grid layer to form a middle layer formation composition having a solid component of 0.2 wt % to 2.0 wt % of a total weight of the middle layer formation composition, and drying the coated middle layer formation composition.

Forming the first middle layer may include forming the first portion at opposing sides of at least some of the plurality of first wire grid lines, a thickness of the first portion may decrease with increasing distance from the opposing sides of the at least some of the first wire grid lines, and a thickness of the second portion may be about 20 nm or less.

Each second wire grid line may be disposed between two adjacent ones of the first wire grid lines and overlaps the second portion, the plurality of first wire grid lines and the plurality of second wire grid lines may be alternately arranged with one another, and a pitch between one of the first wire grid lines and an adjacent one of the second wire grid lines may be about 150 nm or less.

The method for manufacturing a display device may further include forming a second middle layer having the middle layer formation composition on the second wire grid layer; and forming a third wire grid layer including a plurality of third wire grid lines separated from each other on the second middle layer, wherein the second middle layer may include a third portion and a fourth portion having a thinner thickness than the third portion, and wherein a thickness of the fourth portion may be thinner than a thickness of each second wire grid line.

The third portion may be formed at opposing sides of at least some of the second wire grid lines, a thickness of the third portion may decrease with increasing distance from the opposing sides of the at least some of the second wire grid lines, and the thickness of the fourth portion may be about 20 nm or less.

Each third wire grid line may be disposed between two adjacent ones of the second wire grid lines and may overlap the fourth portion, ones of the plurality of first wire grid lines, ones of the plurality of second wire grid lines, and ones of the plurality of third wire grid lines may be respectively sequentially arranged, a pitch between one of the first wire grid lines and an adjacent one of the second wire grid lines may be about 100 nm or less, and a pitch between one of the second wire grid lines and an adjacent one of the third wire grid lines may be about 100 nm or less.

As described above, because the wire grid polarizer according to one or more exemplary embodiments of the invention includes a middle layer that is not flat across the wire grid layers, the thickness of the middle layer may be reduced, even where the wire grid layer has a plurality of separate layers. Thereby, the deterioration of the polarization efficiency caused by a middle layer having a greater thickness may be reduced or prevented.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
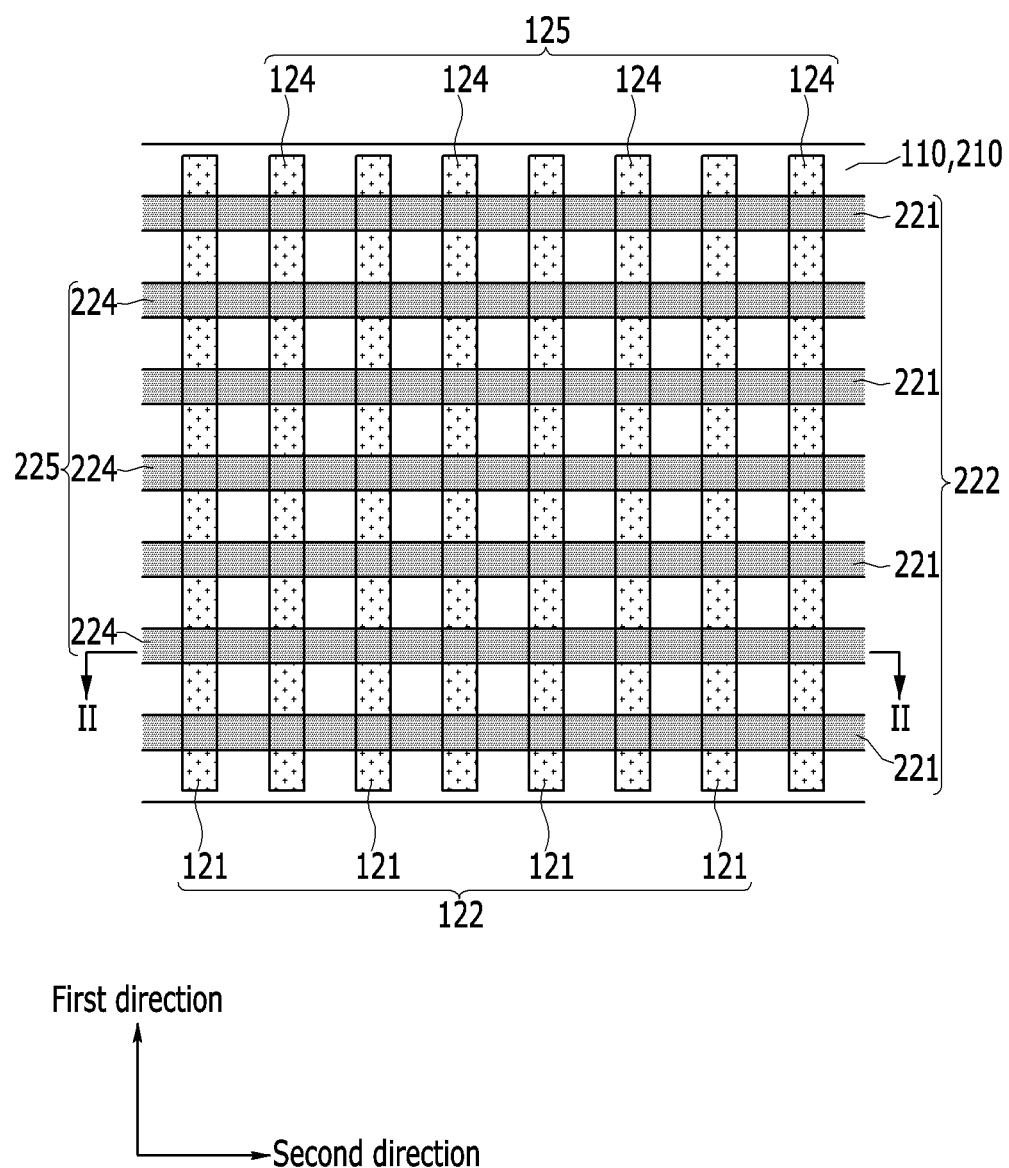
FIG. 1 is a schematic plan view of a first embodiment of a display device constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
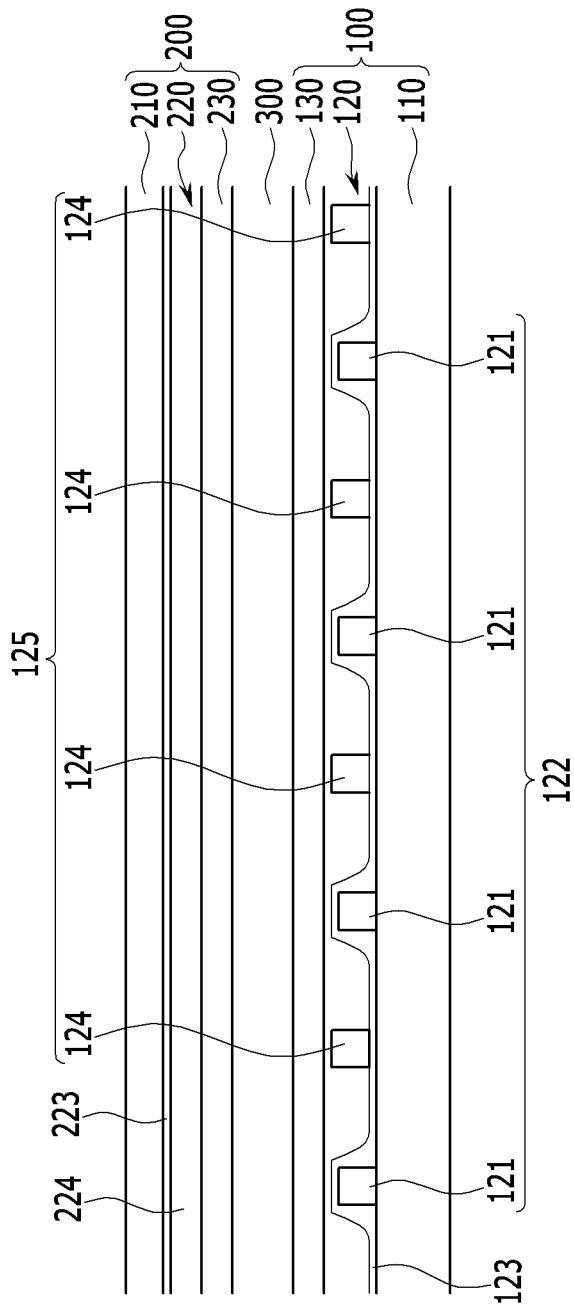
FIG. 2 is a sectional view taken along line II-II of FIG. 1.

Referring to FIG. 1 and FIG. 2, the display device includes a first display panel 100 and a second display panel 200 facing each other, and a liquid crystal layer 300 interposed between the first display panel 100 and the second display panel 200.

First, the first display panel 100 will be described.

The first display panel 100 includes a first substrate 110, a first wire grid polarizer 120, and a first circuit layer 130.

The first substrate 110 may include a transparent insulating material such as a transparent glass or plastic.

The first wire grid polarizer 120 is disposed between the first substrate 110 and the liquid crystal layer 300, and includes a first wire grid layer 122, a first middle layer 123, and a second wire grid layer 125.

The first wire grid layer 122 is disposed on the first substrate 110 and includes a plurality of first wire grid lines 121 separated from each other. The plurality of first wire grid lines 121 extends parallel to each other in a first direction.

The first middle layer 123 is disposed on the first wire grid layer 122, and includes an inorganic material and an organic material that have light transmittance. The inorganic material having light transmittance may be a material of a silica series, and the organic material having light transmittance may be a polyimide (PI) or an acryl-based material.

The second wire grid layer 125 is disposed on the first middle layer 123 and includes a plurality of second wire grid lines 124 separated from each other. The plurality of second wire grid lines 124 are separated from each other by a predetermined interval, and extend parallel to each other in the first direction. The plurality of second wire grid lines 124 do not overlap the first wire grid lines 121, and each line in the second wire grid lines 124 is disposed between two adjacent lines of the first wire grid lines 121 and extends parallel to the first wire grid lines 121.

A width and a length of each of the first wire grid lines 121 may be almost the same as the width and the length of each of the second wire grid lines 124, and may respectively have a single-layered structure including any one of a material among the group including aluminum (Al), molybdenum (Mo), titanium (Ti), gold (Au), silver (Ag), copper (Cu), chromium (Cr), and iron (Fe). Also, the first wire grid lines 121 and the second wire grid lines 124 may have a multi-layer structure including more than one material among the group including aluminum (Al), molybdenum (Mo), titanium (Ti), gold (Au), silver (Ag), copper (Cu), chromium (Cr), and iron (Fe), the more than one materials being selectively deposited.

The first circuit layer 130 is disposed between the first wire grid polarizer 120 and the liquid crystal layer 300. The first circuit layer 130 may include a plurality of thin film transistors, a plurality of gate lines, a plurality of data lines, and a plurality of pixel electrodes. The plurality of thin film transistors may be disposed in a matrix form. A gate line is connected to a gate terminal of the thin film transistor, a data line is connected to a source terminal of the thin film transistor, and a pixel electrode is connected to a drain terminal of the thin film transistor. The plurality of thin film transistors, the plurality of gate lines, the plurality of data lines, and the plurality of pixel electrodes form a plurality of pixels.

Next, the second display panel 200 will be described.

The second display panel 200 includes a second substrate 210, a second wire grid polarizer 220, and a second circuit layer 230.

The second substrate 210 may include a transparent insulating material such as transparent glass or plastic.

The second wire grid polarizer 220 is disposed between the liquid crystal layer 300 and the second substrate 210, and includes a first wire grid layer 222, a first middle layer 223, and a second wire grid layer 225.

The first wire grid layer 222 is disposed between the liquid crystal layer 300 and the second substrate 210 and includes a plurality of first wire grid lines 221 separated from each other. The plurality of first wire grid lines 221 extend respectively parallel to each other in the second direction. The second direction is a direction intersecting the first direction.

The first middle layer 223 is disposed between the liquid crystal layer 300 and the first wire grid layer 222, and includes the inorganic material and the organic material having light transmittance. The inorganic material having light transmittance may be a material of a silica series, and the organic material having light transmittance may be a polyimide (PI) or an acryl-based material.

The second wire grid layer 225 is disposed between the liquid crystal layer 300 and the first middle layer 223 and includes a plurality of second wire grid lines 224 separated from each other. The plurality of second wire grid lines 224 are separated from each other by a predetermined interval, and extend to be parallel to each other in the second direction.

The plurality of second wire grid lines 224 do not overlap the first wire grid lines 221, and each second wire grid line 224 is disposed between adjacent first wire grid lines 221 and extends parallel to the first wire grid lines 221.

A width and a length of each of the first wire grid lines 221 may be almost the same as the width and the length of each of the second wire grid lines 224, and may respectively have a single-layered structure including any one or more material selected from among aluminum (Al), molybdenum (Mo), titanium (Ti), gold (Au), silver (Ag), copper (Cu), chromium (Cr), and iron (Fe). Also, the first wire grid lines 221 and the second wire grid lines 224 may have a multi-layer structure including one or more materials such as aluminum (Al), molybdenum (Mo), titanium (Ti), gold (Au), silver (Ag), copper (Cu), chromium (Cr), and iron (Fe) that are selectively deposited.

As above-described, the first wire grid lines 121 and the second wire grid lines 124 of the first wire grid polarizer 120 and the first wire grid lines 221 and the second wire grid lines 224 of the second wire grid polarizer 220 intersect each other, but the structures thereof are otherwise the same.

The second circuit layer 230 is disposed between the second wire grid polarizer 220 and the liquid crystal layer 300, and includes a light blocking member, a color filter, and a common electrode. The light blocking member and the color filter may be disposed between the liquid crystal layer 300 and the second wire grid polarizer 220, the light blocking member may define the pixel area, and the color filter may be disposed in the region defined by the light blocking member. The common electrode may be disposed between the color filter and the liquid crystal layer 300.

The first wire grid polarizer 120 may be disposed between the first substrate 110 and the liquid crystal layer 300, and the second wire grid polarizer 220 may be disposed between the second substrate 210 and the liquid crystal layer 300. Alternatively, the first substrate 110 may be disposed between the first wire grid polarizer 120 and the liquid crystal layer 300, and the second substrate 210 may be disposed between the second wire grid polarizer 220 and the liquid crystal layer 300.

Next, the wire grid polarizer will be described with reference to FIG. 3.

Figure 3:
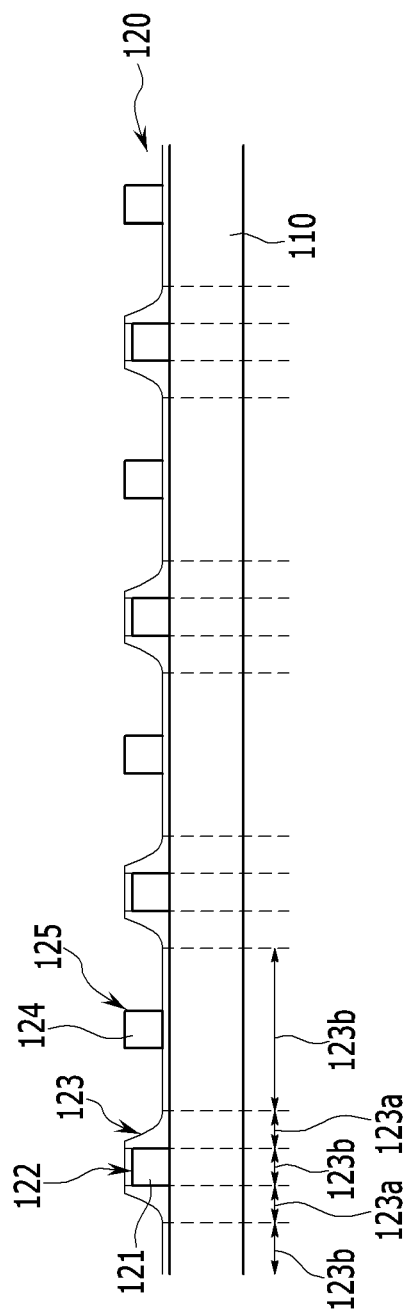
FIG. 3 is a sectional view of the first wire grid polarizer of FIG. 2 indicating additional details thereof.

Referring to FIG. 3, the first wire grid polarizer 120 is disposed on the first substrate 110, and includes the first wire grid layer 122, the first middle layer 123, and the second wire grid layer 125.

The first wire grid layer 122 is disposed on the first substrate 110, and includes a plurality of first wire grid lines 121 separated from each other by the predetermined interval. A pitch between the plurality of first wire grid lines 121 may be 300 nm or less. Here, the pitch between the plurality of first wire grid lines 121 means a sum of an interval value between two first wire grid lines 121 adjacent to each other and a width value of one first wire grid lines 121.

The first middle layer 123 is disposed on the first wire grid layer 122, and includes a first portion 123a and a second portion 123b having a thinner thickness than the first portion 123a.

The first portion 123a is disposed at both sides of the first wire grid lines 121. The first portion 123a has a shape that is inclined from each side of each first wire grid lines 121. That is, the thickness of the first portion 123a is thinner farther away from each side of each first wire grid lines 121.

The second portion 123b is connected to the first portion 123a, and is disposed on each first wire grid line 121 and between two adjacent first wire grid lines 121. The thickness of the second portion 123b is thinner than the thickness of the first wire grid lines 121, and has an almost constant thickness. Here, the thickness of the second portion 123b may be 20 nm or less.

The second wire grid layer 125 is disposed on the first middle layer 123, and includes a plurality of second wire grid lines 124 separated from each other by the predetermined interval. The pitch between the pluralities of second wire grid lines 124 may be 300 nm or less. Here, the pitch between the plurality of first wire grid lines 124 means a sum of an interval value between two first wire grid lines 124 adjacent to each other and a width value of one first wire grid lines 124.

Each second wire grid line 124 is disposed between two first wire grid lines 121 and is disposed on the second portion 123b of the first middle layer 123.

The plurality of first wire grid lines 121 and the plurality of second wire grid lines 124 are alternately disposed. The pitch between the first grid lines grid 121 and the second wire grid lines 124 may be 150 nm or less. Here, the pitch between the first wire grid lines 121 and the second wire grid lines 124 means the sum of the interval value between the first wire grid lines 121 and the second wire grid lines 124 that are adjacent to each other and the width value of one first wire grid lines 121 or one second wire grid lines 124.

As described above, in the wire grid polarizer, the surface of the middle layer disposed between the plurality of wire grid layers is not flat or planar across the width of the wire grid layers. In particular, the thickness of the portion of the middle layer overlapping the wire grid layer is thinner than the thickness of the portion of the middle layer that does not overlap the wire grid layer. Accordingly, the deterioration of the polarization efficiency caused by the middle layer having a substantially constant thickness may be reduced or prevented in the wire grid polarizer having the plurality of wire grid layers as described.

Also, as described above, the structure of the second wire grid polarizer 220 is substantially the same as the structure of the first wire grid polarizer 120, however the first wire grid lines 121 and the second wire grid lines 124 of the first wire grid polarizer 120 and the first wire grid lines 221 and the second wire grid lines 224 of the second wire grid polarizer 220 intersect each other.

Next, a manufacturing method of the display device according to FIG. 1 will be described with reference to FIG. 2 and FIG. 3 along with FIG. 4 and FIG. 5.

Figure 4:
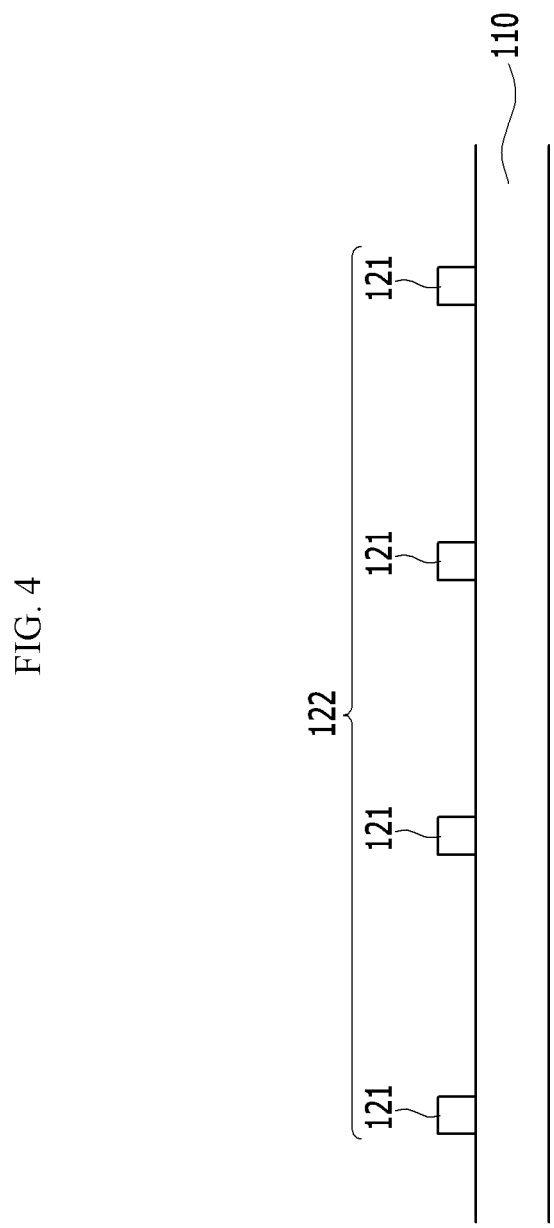
FIG. 4 and FIG. 5 are sectional views of selected steps in a method of manufacturing the display device of FIG. 1.

Referring to FIG. 4, the first wire grid layer 122 including the plurality of first wire grid lines 121 is formed on the first substrate 110.

A metal layer is formed on the first substrate 110, and the metal layer is partially removed by a photolithography process to form the first wire grid layer 122 including the plurality of first wire grid lines 121 separated from each other by the predetermined interval. The pitch between the plurality of first wire grid lines 121 may be 300 nm or less.

Figure 5:
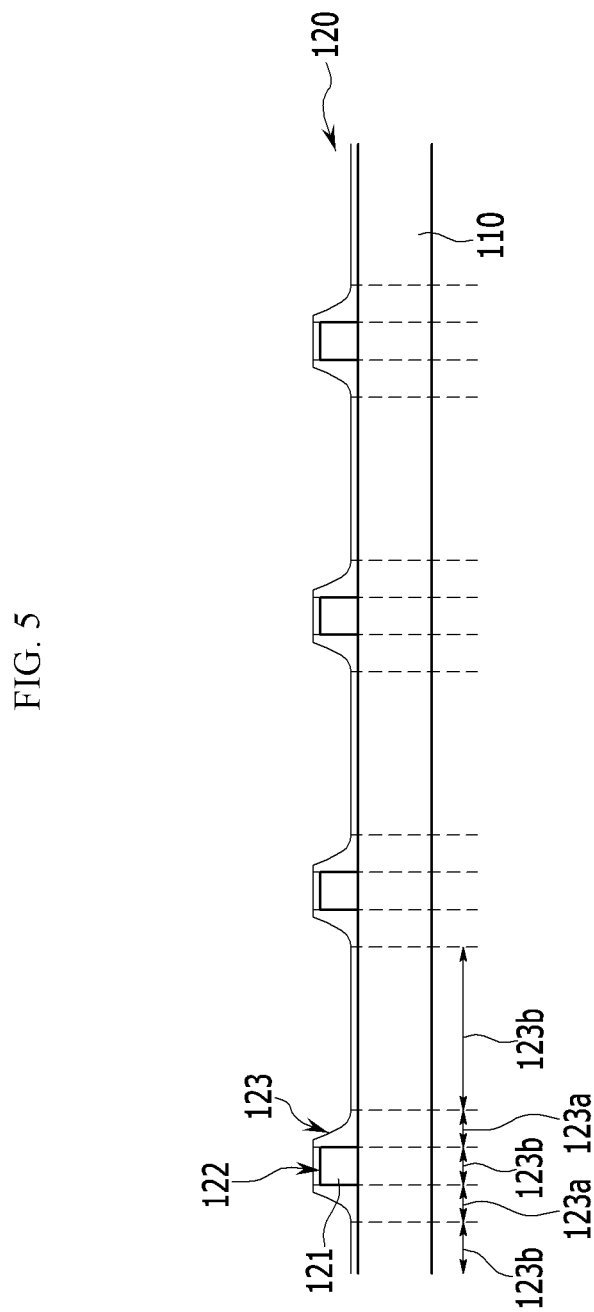

Referring to FIG. 5, the first middle layer 123 is formed on the first wire grid layer 122.

A composition for forming the middle layer is coated and dried on the first wire grid layer 122 to form the first middle layer 123.

The middle layer formation composition includes a solvent, an inorganic material and an organic material having light transmittance. The middle layer formation composition includes a solid component of 0.2 wt % to 2.0 wt % of a total weight of the middle layer formation composition. If the middle layer formation composition is coated on the first wire grid layer 122, the middle layer formation composition is not flat and is formed to be inclined at both sides of each of the first wire grid lines 121, and is formed to be flat on each first wire grid line 121 and for a portion between two first wire grid lines 121.

Next, the coated middle layer formation composition is dried, and the first middle layer 123 including the first portion 123a and the second portion 123b having the thinner thickness than that of the first portion 123a is formed.

The first portion 123a is formed at both sides of each first wire grid line 121, and has the shape that is inclined moving away from each side of each first wire grid line 121. That is, the thickness of the first portion 123a is thinner farther away from each side of each first wire grid line 121.

The second portion 123b is connected to the first portion 123a, and is formed on each first wire grid line 121 and between two adjacent first wire grid lines 121. The thickness of the second portion 123b is thinner than the thickness of the first wire grid lines 121 and has almost a constant thickness. The thickness of the second portion 123b may be 20 nm or less.

Referring to FIG. 3, the second wire grid layer 125 including a plurality of second wire grid lines 124 is formed on the first middle layer 123.

The metal layer is formed on the first middle layer 123 and is partially removed by a photolithography process to form the second wire grid layer 125 having the plurality of second wire grid lines 124 separated from each other by the predetermined interval. The pitch between the plurality of second wire grid lines 124 may be 300 nm or less.

Each second wire grid line 124 is formed on the second portion 123b of the first middle layer 123 disposed between two first wire grid lines 121.

The plurality of first wire grid lines 121 and the plurality of second wire grid lines 124 are formed such that they are alternately disposed. The pitch between the first wire grid lines 121 and the second wire grid lines 124 may be 150 nm or less.

As above-described, as the first middle layer 123 is formed by using the middle layer formation composition including the solid component of 0.2 wt % to 2.0 wt % of the total weight of the middle layer formation composition, the first middle layer 123 including the first portion 123a, which is not planar across the width of the layers as is conventional, but instead has the inclined shape, and the second portion 123b having the thinner thickness than the first portion 123a, may be formed.

Also, since the second wire grid lines 124 are formed on the second portion 123b of the portion of the first middle layer 123 that is thinner, the deterioration of the polarization efficiency caused by the thickness of the first middle layer 123 may be reduced or prevented in the wire grid polarizer having two wire grid layers as described above.

Further, since the first wire grid polarizer 120 has two wire grid layers, while the pitch of each wire grid layer is more widely formed, the interval between two adjacent wire grid lines of the overall wire grid polarizer may be narrowly formed.

Referring to FIG. 2, the first display panel 100 is completed by forming the first circuit layer 130 on the first wire grid polarizer 120.

After forming the second display panel 200 including the second substrate 210, the second wire grid polarizer 220, and the second circuit layer 230, liquid crystal is dripped on the first display panel 100 or the second display panel 200 to form the liquid crystal layer 300, and then the first and second display panels 100 and 200 are combined.

Also, after combining the first and second display panels 100 and 200, the liquid crystal may be injected between the first and second display panels 100 and 200 to form the liquid crystal layer 300.

The second wire grid polarizer 220 is formed by the same process as the first wire grid polarizer 120. However, the first and second display panels 100 and 200 are combined for the first wire grid lines 121 and the second wire grid lines 124 of the first wire grid polarizer 120 and the first wire grid lines 221 and second wire grid lines 224 of the second wire grid polarizer 220 intersect each other.

Figure 6:
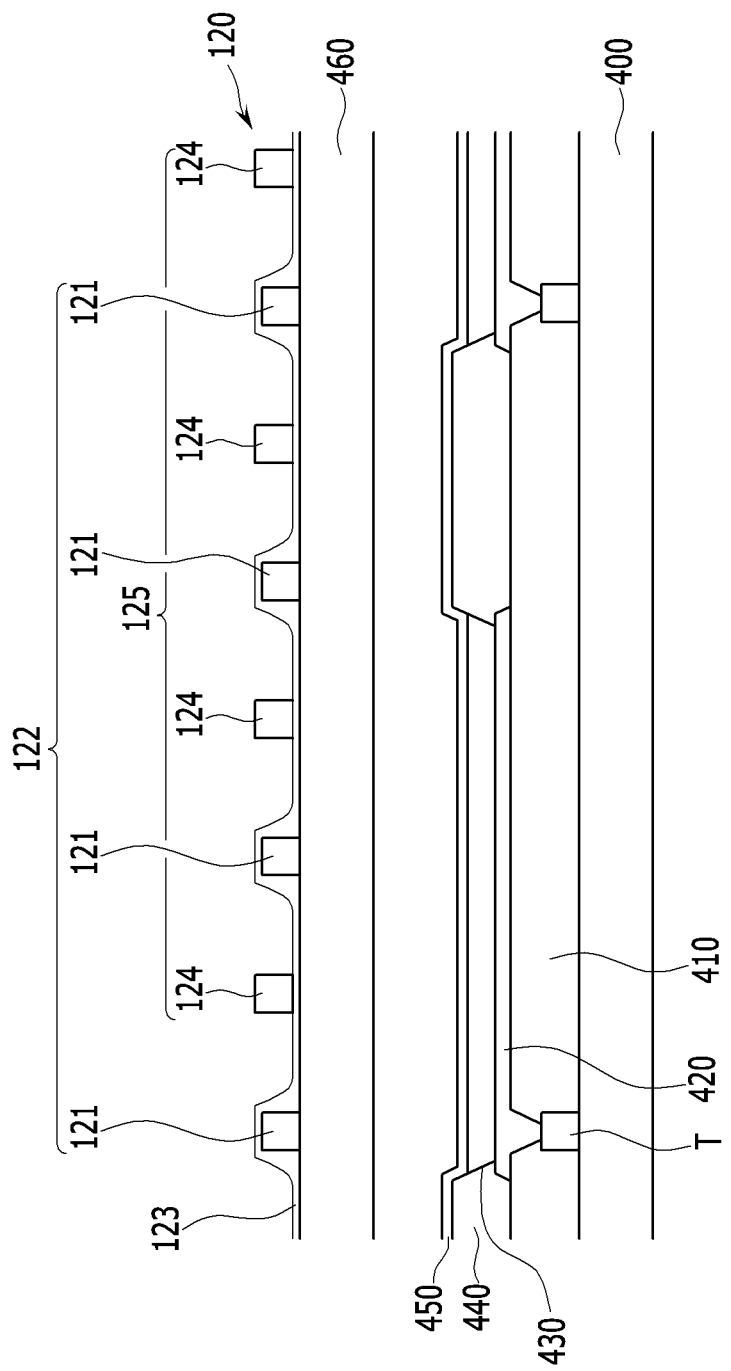
FIG. 6 is a sectional view of a second embodiment of a display device constructed according to the principles of the invention.

Referring to FIG. 6, the display device includes a first electrode 420, a second electrode 450, and an organic emission layer 430 disposed between the first electrode 420 and the second electrode 450.

A thin film transistor T is disposed on an insulation substrate 400, and a passivation layer 410 is disposed on the thin film transistor T.

The first electrode 420 connected to the thin film transistor T and a pixel definition layer 440 are disposed on the passivation layer 410.

The pixel definition layer 440 has an opening overlapping the first electrode 420, the organic emission layer 430 is disposed on the first electrode 420 overlapping the opening of the pixel definition layer 440, and the second electrode 450 is disposed on the organic emission layer 430 and the pixel definition layer 440. The first electrode 420 may be an anode, and the second electrode 450 may be a cathode. Alternatively, the first electrode 420 may be the cathode, and the second electrode 450 may be the anode.

An encapsulation substrate 460 is disposed on the second electrode 450, and the first wire grid polarizer 120 is disposed on the encapsulation substrate 460. A filler may be disposed between the encapsulation substrate 460 and the second electrode 450.

The structure of the first wire grid polarizer 120 is the same as the structure of the first wire grid polarizer 120 described above in connection with the display device of FIG. 1.

In the previously described embodiments, the wire grid polarizer has two wire grid layers. However, in other embodiments, the wire grid polarizer may have three wire grid layers. Next, an example of an embodiment where the wire grid polarizer has three wire grid layers will be described with reference to FIG. 7.

Figure 7:
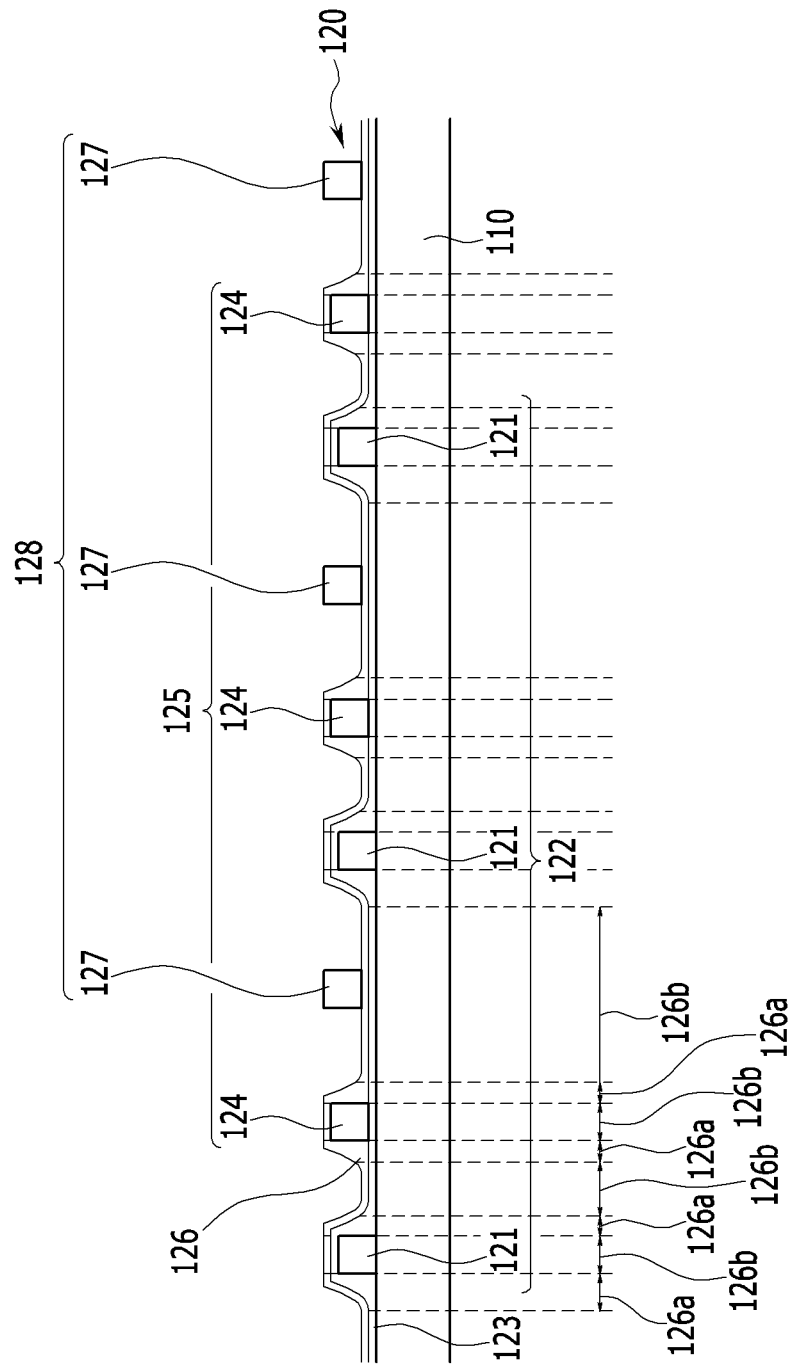
FIG. 7 is a sectional view of a second embodiment of a wire grid polarizer constructed according to the principles of the invention.

Referring to FIG. 7, the first wire grid polarizer 120 has substantially the same configurations as the wire grid polarizer according to the exemplary embodiment of FIG. 1, except for the addition of the second middle layer and the third wire grid layer. A description of the same configurations will be omitted.

Contrary to the wire grid polarizer according to the previously described embodiments, the first wire grid polarizer 120 in FIG. 7 is disposed on the second wire grid layer 125, and a second middle layer 126 including the same material as the first middle layer 123 and a third wire grid layer 128 disposed on the second middle layer 126 are further included.

The second middle layer 126 includes a third portion 126a and a fourth portion 126b having a thinner thickness than the third portion 126a. This structure is comparable to that previously described in connection with the first middle layer 123.

The third portion 126a is disposed at both sides of each second wire grid line 124. The third portion 126a has a shape that is inclined downwardly moving away from each side of each second wire grid lines 124. That is, the thickness of the third portion 126a becomes thinner while moving farther away from each side of each second wire grid lines 124.

The fourth portion 126b is connected to the third portion 126a, and is disposed on each second wire grid line 124 and between two adjacent second wire grid lines 124. The fourth portion 126b has a thinner thickness than the thickness of the second wire grid 124 and may have an almost constant thickness. The thickness of the fourth portion 126b may be 20 nm or less.

The third wire grid layer 128 is disposed on the second middle layer 126, and includes a plurality of third wire grid lines 127 separated from each other by the predetermined interval. The width and the length of each of the third wire grid lines 127 are the almost same as the width and the length of each of the first wire grid lines 121, the second wire grid lines 124, and the third wire grid lines 127, and they may have the single-layered structure including any one or more materials selected from among aluminum (Al), molybdenum (Mo), titanium (Ti), gold (Au), silver (Ag), copper (Cu), chromium (Cr), and iron (Fe). Also, the third wire grid layer 128 may have the multilayered structure including two or more materials selected from among aluminum (Al), molybdenum (Mo), titanium (Ti), gold (Au), silver (Ag), copper (Cu), chromium (Cr), and iron (Fe) that are selectively stacked.

The pitch between the plurality of third wire grid lines 127 may be 300 nm or less. The pitch between the plurality of third wire grid lines 127 means the sum of the interval value between two third wire grid lines 127 adjacent to each other and the width value of one third wire grid line 127.

Each third wire grid line 127 is disposed on the fourth portion 126b of the second middle layer 126 between one second wire grid line 124 and one first wire grid line 121 adjacent to each other.

The plurality of first wire grid lines 121, the plurality of second wire grid lines 124, and the plurality of third wire grid lines 127 are thus alternately sequentially disposed.

The pitch between the first wire grid lines 121 and the second wire grid lines 124 may be 100 nm or less. The pitch between the first wire grid lines 121 and the second wire grid lines 124 means the sum of the interval value between the first wire grid lines 121 and the second wire grid lines 124 adjacent to each other and the width value of one first wire grid line 121 or one second wire grid line 124.

The pitch between the second wire grid lines 124 and the third wire grid lines 127 may be 100 nm or less. The pitch between the second wire grid lines 124 and the third wire grid lines 127 means the sum of the interval value between adjacent second wire grid lines 124 and third wire grid lines 127 and the width value of one second wire grid line 124 or one third wire grid line 127.

As described above, because the surfaces of the first middle layer 123 and the second middle layer 126 are not flat, and because the second wire grid lines 124 and the third wire grid lines 127 are disposed on the second portion 123b and the fourth portion 126b having the thinner thickness among the variable thicknesses of the first middle layer 123 and the second middle layer 126, in the wire grid polarizer having three wire grid layers, the deterioration of the polarization efficiency caused by the greater thickness of the planarization layer(s) may be reduced or prevented.

Also, because the wire grid polarizer has three wire grid layers, while the pitch of each wire grid layer is more widely formed, the interval between two adjacent wire grid lines of the wire grid polarizer may be more narrowly formed, thereby more easily forming the wire grid polarizer.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display device comprising:
   a substrate; and
   a wire grid polarizer disposed on the substrate,
   wherein the wire grid polarizer comprises:
      a first wire grid layer comprising a plurality of first wire grid lines separated from each other;
      a first middle layer disposed on the first wire grid layer, the first middle layer comprising a first portion having a first middle layer thickness and a second portion having a second middle layer thickness thinner than the first middle layer thickness, the second middle layer thickness being thinner than a thickness of each first wire grid line; and
      a second wire grid layer disposed on the first middle layer, the second wire grid layer comprising a plurality of second wire grid lines separated from each other, the plurality of second wire grid lines overlapping the second portion of the first middle layer.

2. The display device of claim 1, wherein the second middle layer thickness is about 20 nm or less.

3. The display device of claim 2, wherein the first middle layer comprises an inorganic material and an organic material.

4. The display device of claim 1, wherein:
   the first portion is disposed at opposing sides of at least some of the first wire grid lines; and the first middle layer thickness decreases with increasing distance from the opposing sides of the at least some of the first wire grid lines.

5. The display device of claim 4, wherein each second wire grid line is disposed between two adjacent ones of the first wire grid lines, and overlaps the second portion.

6. The display device of claim 5, wherein the plurality of first wire grid lines and the plurality of second wire grid lines are alternately arranged with one another.

7. The display device of claim 6, wherein a pitch between one of the first wire grid lines and an adjacent one of the second wire grid lines is about 150 nm or less.

8. The display device of claim 5, wherein the wire grid polarizer further comprises:
a second middle layer disposed on the second wire grid layer; and
a third wire grid layer disposed on the second middle layer, the third wire grid layer comprising a plurality of third wire grid lines separated from each other.

9. The display device of claim 8, wherein:
the second middle layer is made of the same material as the first middle layer;
the second middle layer comprises a third portion and a fourth portion having a thinner thickness than the third portion;
a thickness of the fourth portion is thinner than a thickness of each second wire grid line;
the thickness of the fourth portion is about 20 nm or less; and
the plurality of third wire grid lines overlap the fourth portion of the third middle layer.

10. The display device of claim 9, wherein:
the third portion is disposed at opposing sides of at least some of the second wire grid lines; and
a thickness of the third portion decreases with increasing distance from the opposing sides of the at least some of the second wire grid lines.

11. The display device of claim 10, wherein each third wire grid line is disposed between two adjacent ones of the second wire grid lines and overlaps the fourth portion.

12. The display device of claim 11, wherein ones of the plurality of first wire grid lines, ones of the plurality of second wire grid lines, and ones of the plurality of third wire grid lines are respectively sequentially arranged.

13. The display device of claim 12, wherein:
a pitch between one of the first wire grid lines and an adjacent one of the second wire grid lines is about 100 nm or less; and
a pitch between one of the second wire grid lines and an adjacent one of the third wire grid lines is about 100 nm or less.

14. A method for manufacturing a display device, comprising:
forming a first wire grid layer comprising a plurality of first wire grid lines separated from each other on a substrate;
forming a first middle layer on the first wire grid layer with a first portion and a second portion being thinner than the first portion and thinner than a thickness of each first wire grid line; and
forming a second wire grid layer comprising a plurality of second wire grid lines separated from each other on the first middle layer.

15. The method of claim 14, wherein forming the first middle layer comprises:
coating a composition comprising an organic material, an inorganic material, and a solvent on the first wire grid layer to form a middle layer formation composition having a solid component of 0.2 wt % to 2.0 wt % of a total weight of the middle layer formation composition; and
drying the coated middle layer formation composition.

16. The method of claim 15, wherein:
forming the first middle layer comprises forming the first portion at opposing sides of at least some of the plurality of first wire grid lines;
a thickness of the first portion decreases with increasing distance from the opposing sides of the at least some of the first wire grid lines; and
a thickness of the second portion is about 20 nm or less.

17. The method of claim 16, wherein:
each second wire grid line is disposed between two adjacent ones of the first wire grid lines and overlaps the second portion;
the plurality of first wire grid lines and the plurality of second wire grid lines are alternately arranged with one another; and
a pitch between one of the first wire grid lines and an adjacent one of the second wire grid lines is about 150 nm or less.

18. The method of claim 16, further comprising:
forming a second middle layer having the middle layer formation composition on the second wire grid layer; and
forming a third wire grid layer comprising a plurality of third wire grid lines separated from each other on the second middle layer,
wherein the second middle layer comprises a third portion and a fourth portion having a thinner thickness than the third portion, and
wherein a thickness of the fourth portion is thinner than a thickness of each second wire grid line.

19. The method of claim 18, wherein:
the third portion is formed at opposing sides of at least some of the second wire grid lines;
a thickness of the third portion decreases with increasing distance from the opposing sides of the at least some of the second wire grid lines; and
the thickness of the fourth portion is about 20 nm or less.

20. The method of claim 19, wherein:
each third wire grid line is disposed between two adjacent ones of the second wire grid lines and overlaps the fourth portion;
ones of the plurality of first wire grid lines, ones of the plurality of second wire grid lines, and ones of the plurality of third wire grid lines are respectively sequentially arranged;
a pitch between one of the first wire grid lines and an adjacent one of the second wire grid lines is about 100 nm or less; and
a pitch between one of the second wire grid lines and an adjacent one of the third wire grid lines is about 100 nm or less.

* * * * *